UNITED STATES PATENT OFFICE.

GEORGE WASHINGTON BOGGS, OF PHILADELPHIA, PENNSYLVANIA.

COMPOSITION OF MATTER.

933,875.

Specification of Letters Patent.  Patented Sept. 14, 1909.

No Drawing.   Application filed February 12, 1908.  Serial No. 415,539.

*To all whom it may concern:*

Be it known, that I, GEORGE WASHINGTON BOGGS, a citizen of the United States, residing at Philadelphia, Pennsylvania, have invented certain new and useful Improvements in Composition of Matter; and I do hereby declare the following to be a full, clear, and exact description of the invention, such as will enable others skilled in the art to which it appertains to make and use the same.

My invention relates to a composition of matter for removing the soot from the mantles of incandescent gas lamps, such as are generally known as Welsbach lamps. It is well known that the mantles of such incandescent gas lamps frequently become blackened by deposits of soot after having been in use for a time. It is a common practice to change the supply of air and gas by an adjustment of the vents in such lamps, for the purpose of burning off this deposit of soot. This adjustment of the vents usually results in jarring the mantle and thus generally causes an injury to or even entire destruction of the mantle which, as is well known, is quite fragile.

The object of my invention is to avoid this difficulty, and with this object in view my invention comprises a powder which may be sifted or blown onto the mantle, and which, when the lamp is again lighted, causes the soot to burn off quickly, leaving the mantle in good condition for further use.

In preparing my powder, I proceed as follows: I first grind together one part each, by measure, of sodium chlorid and corn starch until a fine powder is produced. To this is then added one part, by measure, of sulfate of potash, one part of carbonate of magnesium and about one-seventh part of a suitable coloring matter such as the dry coloring material known commercially as water color; such as a composition containing the coloring matter of saffron. The whole mass is then ground together for the purpose of intimately commingling all the ingredients and at the same time insuring the production of a fine powder. The powder thus produced is then ready to be applied to a mantle which is blackened by soot.

To do this, the light is turned out and the powder sprinkled, sifted or blown onto the mantle and particularly upon the blackened portion. The gas is then lighted and turned down very low, whereupon the soot will quickly vanish, usually requiring from about ten seconds to one minute.

The powder may be put up for commercial use in a box with a perforated or gauze top, whereby it may readily be sifted out upon the mantles to be cleared. For inverted mantles, however, it is more convenient to blow the powder onto the mantles by first removing the lamp globe and blowing the powder from any desired powder blow-gun.

By the use of the powder described, the useful life of the mantle is prolonged, and thereby a considerable economy results. At the same time, the powder is not explosive, does not burn and contains no poison. The manner of using it is so simple, that it may be applied even by unskilled persons.

A further advantage of the powder is that after treatment with it the mantle has an increased brilliancy.

Having thus fully described my invention, what I claim is:—

1. A composition of matter for clearing soot from incandescent gas mantles, said composition comprising compounds of magnesium, sodium, and potassium united with a starch and ground to a fine powder.

2. A composition of matter for clearing the soot from incandescent gas mantles, consisting of a powder comprising one part each of magnesium carbonate, potassium sulfate, sodium chlorid, and a starch.

3. A composition of matter for clearing the soot from incandescent gas mantles, consisting of a powder comprising one part each of magnesium carbonate, potassium sulfate, sodium chlorid, and starch, and a suitable coloring matter.

In testimony whereof I hereunto affix my signature in the presence of two witnesses.

GEORGE WASHINGTON BOGGS.

Witnesses:
ROBERT FLOYD BOGGS,
MARGARET S. DAVIS.